United States Patent
Masfaraud et al.

(10) Patent No.: US 7,923,949 B2
(45) Date of Patent: Apr. 12, 2011

(54) METHOD FOR CONTROLLING POLYPHASE ROTATING ELECTRICAL MACHINE

(75) Inventors: Julien Masfaraud, Paris (FR); Hugues Doffin, Creteil (FR); Farouk Boudjemai, Marcoussis (FR)

(73) Assignee: Valeo Equipments Electriques Moteur, Creteil (FR)

( * ) Notice: Subject to any disclaimer, the term of this patent is extended or adjusted under 35 U.S.C. 154(b) by 318 days.

(21) Appl. No.: 12/161,050

(22) PCT Filed: Jan. 5, 2007

(86) PCT No.: PCT/FR2007/050617
§ 371 (c)(1),
(2), (4) Date: Jul. 16, 2008

(87) PCT Pub. No.: WO2007/083049
PCT Pub. Date: Jul. 26, 2007

(65) Prior Publication Data
US 2010/0164415 A1 Jul. 1, 2010

(30) Foreign Application Priority Data
Jan. 20, 2006 (FR) ...................... 06 00536

(51) Int. Cl.
H02P 1/40 (2006.01)
(52) U.S. Cl. ......... 318/289; 318/288; 318/287; 318/280
(58) Field of Classification Search .......... 318/289, 318/288, 287, 280, 254.1, 138, 439
See application file for complete search history.

(56) References Cited

U.S. PATENT DOCUMENTS

| | | | |
|---|---|---|---|
| 3,909,688 A | 9/1975 | Blaschke et al. | |
| 4,271,385 A | 6/1981 | Azusawa | |
| 4,803,376 A | 2/1989 | N'Guyen | |
| 5,432,695 A * | 7/1995 | Vlatkovic et al. | 363/138 |
| 5,708,578 A * | 1/1998 | Stoddard et al. | 363/98 |
| 6,605,912 B1 * | 8/2003 | Bharadwaj et al. | 318/400.09 |
| 6,924,611 B1 | 8/2005 | Tzeng et al. | |
| 7,227,339 B2 * | 6/2007 | Kobayashi et al. | 318/400.01 |
| 7,301,789 B2 * | 11/2007 | Wiseman | 363/56.12 |
| 2005/0283324 A1 | 12/2005 | Swanson | |

FOREIGN PATENT DOCUMENTS

| | | |
|---|---|---|
| EP | 0 260 176 | 3/1988 |
| FR | 2 026 121 | 9/1970 |
| WO | WO 2004/100351 | 11/2004 |

* cited by examiner

*Primary Examiner* — Walter Benson
*Assistant Examiner* — David S Luo
(74) *Attorney, Agent, or Firm* — Berenatio & White, LLC

(57) ABSTRACT

A method for controlling a reversible polyphase rotating electrical machine, wherein at least one coil circuit is supplied through a bridge of switches, including the following steps: controlling (P1) the bridge to deliver to the coil circuit a periodic voltage with a phase shift (d) relative to an electromotive force induced in the coil circuit, such that an operating torque is generated, the phase shift having initially a first value (d0); controlling (P2) the bridge to deliver to the coil circuit a periodic voltage with the phase shift (d) producing a torque ranging between the operating torque and the opposite of the operating torque, the phase shift taking on a plurality of values upon the control; flipping (T2) the bridge in rectifying mode.

16 Claims, 3 Drawing Sheets

METHOD FOR CONTROLLING POLYPHASE ROTATING ELECTRICAL MACHINE

CROSS-REFERENCE TO RELATED APPLICATIONS AND CLAIM TO PRIORITY

This application relates to International Application No. PCT/FR2007/050617 filed Jan. 5, 2007 and French Patent Application No. 0600536 filed Jan. 20, 2006, of which the disclosures are incorporated herein by reference and to which priority is claimed.

FIELD OF THE INVENTION

The invention concerns a method of controlling a reversible polyphase rotary electrical machine in which at least one coiled circuit is supplied through a switch bridge, such as for example an alternator starter.

PRIOR ART

A rotary electrical machine conventionally comprises a rotor and a stator. One of these elements has a direct current passing through it and thus generates a constant magnetic field of fixed orientation with respect to this element. The other element comprises a plurality of distinct windings angularly spaced apart; each winding has passing through it a current offset in phase with respect to that of the other winding so as to create a rotating magnetic field. The coexistence of the fixed-orientation field of the first element and the rotating field of the second element causes the rotation of these elements with respect to each other, that is to say the rotation of the rotor with respect to the stator.

The various currents are generally injected into the windings of the polyphase element through a bridge formed by power switches (in general diodes associated with power transistors).

This power bridge is in general controlled by an electronic module that fixes the opening and closing times of the switches and thus controls the phase of the various currents through the windings.

In order to determine the switch control times, the electronic module normally uses signals representing the position of the rotor with respect to the stator, such as for example position sensors regularly distributed over the circumference of the rotary machine, which each send periodic signals at the rotation frequency of the rotor and offset in phase with respect to each other.

Where the rotary electrical machine is reversible, the power bridge fulfils the role of a bridge rectifier during the functioning of the power bridge in rectification mode, which corresponds to an alternator-type functioning of the machine.

For the purpose of approaching an optimum torque over a wider range of rotation speeds, the document WO 2004/100351 proposes to process the signals issuing from the sensors by weighting and adding, in practice by means of an analogue circuit composed of capacitors and resistors, which makes it possible to achieve phase offsets continuously variable over the entire range of rotation speeds.

By virtue of this type of solution, it is possible to provide consistent torque even for high rotation speeds, which can for example be used for assisting a thermal engine during the acceleration phases of a vehicle.

However, when switching directly to functioning in alternator mode under these conditions, for example at the end of the acceleration phase of a vehicle, the electromagnetic force applied to the power bridge causes, without special precautions, a high output on the network, which may prove unacceptable at high rotation speeds.

It is therefore necessary to await a sufficiently great reduction in the direct current ("defluxing" of the part through which this current is passing, namely in general the rotor) before returning to alternator mode, and the change in mode is therefore dependent on the defluxing time constant, which is also not desirable.

OBJECT OF THE INVENTION

In order in particular to avoid these problems, the invention proposes a method of controlling a reversible polyphase rotary electrical machine, in which at least one coiled circuit is supplied through a switch bridge, characterised by the following steps:

controlling the bridge in order to deliver to the coiled circuit a periodic voltage with a phase difference with respect to an electromotive force induced in the said coiled circuit, such that a motor torque is generated, the phase difference initially having a first value;

controlling the bridge in order to deliver to the said coiled circuit a periodic voltage with the said phase difference causing the production of a torque lying between the said motor torque and the opposite of the said motor torque, the phase difference taking a plurality of values during this control;

switching the bridge into rectification mode.

The "motor" operating mode is thus separated from the conventional "alternator" mode (the bridge functions as a rectifier) by a mode in which the bridge is controlled (with a resisting torque), which may therefore be termed "controlled alternator mode". The transition between the two modes is thus attenuated.

The invention thus makes it possible, when passing from "motor" operating mode to "alternator" operating mode, to control the decrease in current absorbed by the switch bridge and/or to limit a voltage peak at a terminal of the battery.

According to non-limitative embodiments, the device according to the invention can comprise one or more of the following characteristics:

The phase difference in the voltage delivered can take a plurality of values decreasing over time between the first phase difference value and a second phase difference value, which makes it possible to vary the torque in steps and also attenuates the transition between the two modes.

The use of the first phase difference and the use of the second difference are separated by a time of between 1 μs and 100 μs. The change to controlled alternator mode therefore takes place very rapidly (compared in particular with the defluxing time mentioned above).

The induction current reduction step lies for example between the step of controlling the bridge with a second phase difference and the step of switching the bridge into rectification mode. The functioning in controlled alternator mode is thus well controlled.

According to another design possibility, the step of reducing the induction current initiated while a motor torque is generated. This solution makes it possible to limit the duration of the controlled alternator mode.

The switching step can be subsequent to the reduction step by more than 10 ms in order to profit from part of the refluxing phenomenon.

The switching step is however preferably subsequent to the reduction step by less than 0.5 s, which allows a more rapid switching than the conventional solution consisting of awaiting total refluxing.

The rotation speed of the rotary machine is in general (but not necessarily) essentially constant during all the aforementioned steps.

Moreover, it is possible to provide for the said torque of opposite sign to be approximately equal to the torque exerted by the rotary machine in rectification mode, which further limits the transient phenomena.

The invention also proposes a reversible polyphase rotary electrical machine in which at least one coiled circuit is able to be supplied through a switch bridge, characterised by first means of controlling the bridge for delivering to the coiled circuit a periodic voltage with a phase difference with respect to an electromotive force in the said coiled circuit, such that a motor torque is generated, the phase difference initially having a first value; second means of controlling the bridge for delivering to the said coiled circuit a periodic voltage with the phase difference causing the production of a torque lying between the said motor torque and the opposite of the said motor torque, the phase difference taking a plurality of values during this control; and means for switching the bridge into rectification mode.

In an example embodiment of the invention, the machine comprises at least one mixing circuit, comprising for example at least switch and/or at least one resistor.

BRIEF DESCRIPTION OF THE FIGURES

Other characteristics and advantages of the invention will emerge in the light of the following description, given with reference to the accompanying drawings, in which.

DETAILED DESCRIPTION OF NON-LIMITATIVE EMBODIMENTS OF THE INVENTION

Figure 1:
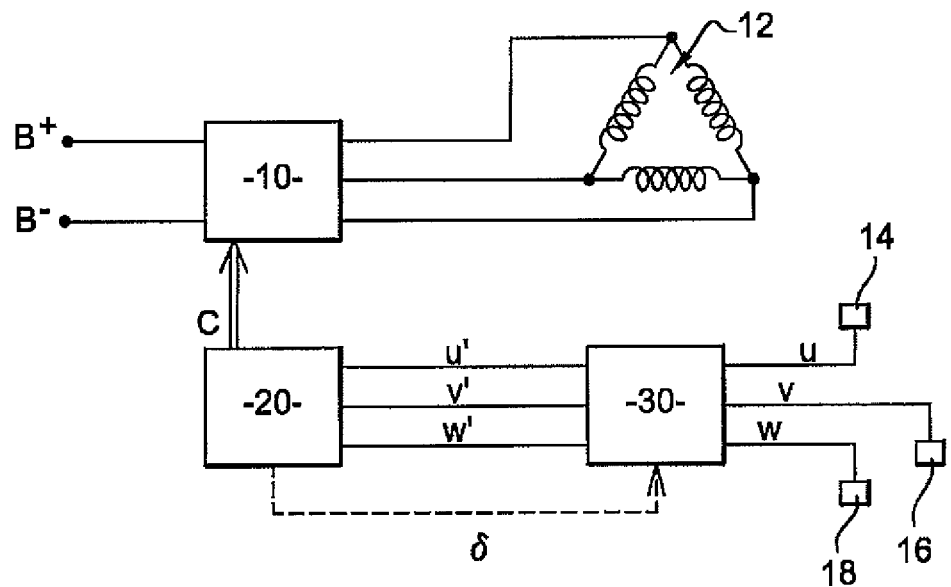
FIG. 1 depicts the electrical circuit elements of a polyphase rotary electrical machine.

FIG. 1 depicts the essential elements of the electrical circuit of a polyphase rotary electrical machine, for example reversible of the alternator starter type.

Such a machine comprises a power bridge 10 that supplies the three phases of a three-phase stator 12 from a voltage generated between the two terminals B$^+$, B$^-$ of supply battery.

The power bridge 10 is formed by switches (not shown) that are controlled by control signals C so that the various windings of the stator have signals passing through them offset by 120° with respect to one another.

The control signals C are generated by an electronic control module on the basis of signals U, V, W issuing from three linear sensors 14, 16, 18 equally distributed over the circumference of the rotary machine.

Precisely, the signals U, V, W issuing from the sensors are processed by a phase lead unit 30 that delivers three signals U', V', W' corresponding to the sensor signals U, V, W with a phase lead δ with respect to these.

The signals U', V', W' generated by the phase lead unit 30 are used by a control circuit 20 to form the control signals C of the power bridge 10.

The phase lead δ mentioned above depends for example on the speed of the machine as measured by means of the sensor signals U, V, W. The phase lead δ can in this case be determined in real time within the phase lead unit 30 as described below.

In a variant, it is possible to provide for the control circuit 20 to generate a signal linked to the phase lead value δ as indicated in broken lines in FIG. 1. To do this, the control circuit comprises for example a micro-controller (including a microprocessor) that determines the rotation speed of the machine on the basis of the signals U' B' W' and that deduces therefrom the phase difference δ to be used, possibly also depending on other conditions, such as the operating phase. The offset value δ associated with a given speed and a given operating condition is for example stored within the microcontroller in a look-up table.

When the machine is functioning in alternator mode, the power bridge 10 fulfils the role of a bridge rectifier that provides the transmission of energy from the machine (and in particular from the stator 12) to the battery (B$^+$, B$^-$).

Figure 2:
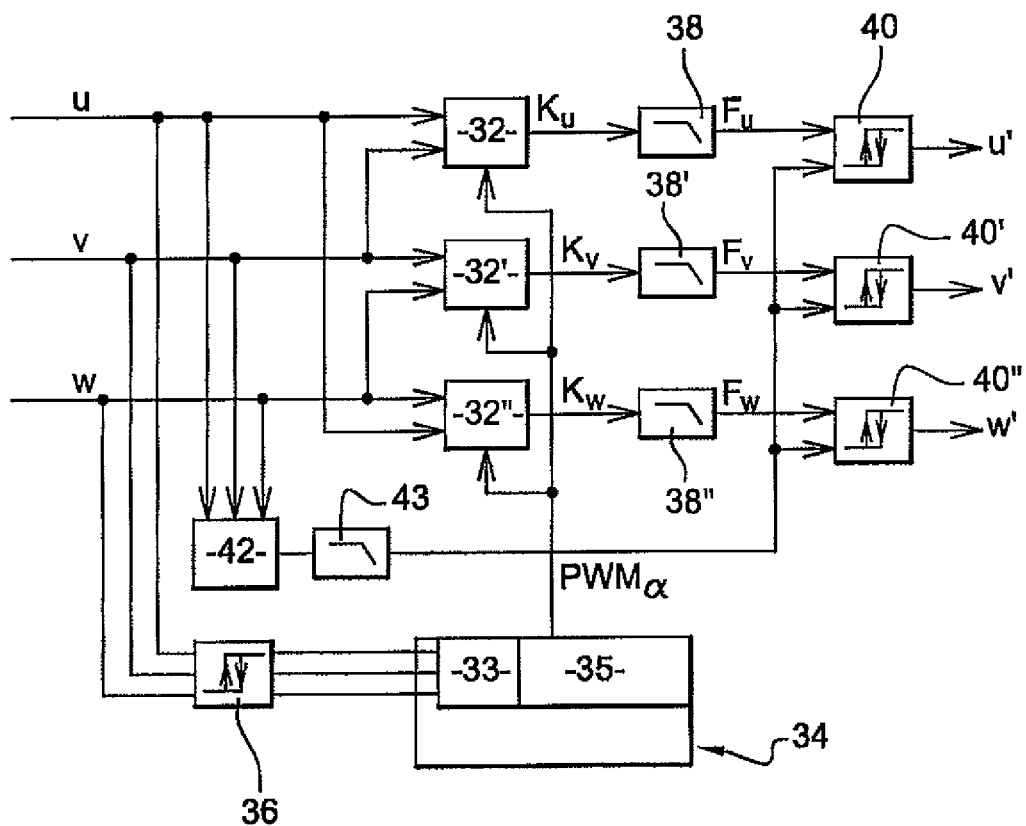
FIG. 2 depicts an embodiment of the phase lead unit of FIG. 1.

FIG. 2 depicts an embodiment that can be envisaged for the phase lead unit 30.

In this embodiment, each signal U, V, W issuing from a sensor 14, 16, 18 is applied to a first input of a so-called "mixing" circuit respectively 32, 32', 32", example embodiments of which will be given hereinafter.

Each mixing circuit 32, 32', 32" also receives, at a second input, the signal V, W, U issuing from a sensor and having a phase lead of 120° with respect to the sensor signal U, V, W received at its first input.

Thus each mixing circuit 32, 32', 32" receives at its first input one of the sensor signals U, V, W and at its second input the sensor signal V, W, U in phase lead of 120° with respect to the one received at the first input.

Each mixing circuit 32, 32', 32" also receives a control signal PWM$_\alpha$ formed by pulses with a duty cycle ratio α. The control signal PWM$_\alpha$ controls the switching elements of the mixing circuits 32, 32", 32" as described below.

In the embodiment depicted in FIG. 2, the same control system PWM$_\alpha$ is applied to all the three mixers 32, 32', 32". In a variant, it would naturally be possible to provide specific control signals for each mixing circuit.

In the embodiment depicted in FIG. 2, the control signal PWM$_\alpha$ is generated on a pin of a microprocessor 34, a part 35 of which is dedicated to the generation of this control signal PWM$_\alpha$ (part means here a part of the software that controls the microprocessor 34; in a variant, the fulfillment of the same function in hard-wired logic could be envisaged).

As visible in FIG. 2, the microprocessor 34 also receives the signals U, V, W issuing from the sensors 14, 16, 18 through a first hysteresis trigger circuit 36. The signals thus received are intended for a part 33 of the microprocessor 34 dedicated to the determination of the speed of the rotary machine.

The rotation speed information thus determined is in particularly used in the microprocessor 34 to determine the phase lead to be produced by the phase lead unit 30 according to which the duty cycle ratio α of the signal PWM$_\alpha$ to be applied to the mixing circuit 32, 32', 32" is determined.

The relationship between the speed determined by the speed determination part 33 and the duty cycle ratio α (either directly or by means of the phase difference δ) is for example stored in a memory associated with the microprocessor 34 in the form of a look-up table.

The required phase difference δ (and consequently the duty cycle ratio α used) can naturally depend on other parameters than the rotation speed of the rotary machine, such as for example the operating mode of the rotary machine. It is possible in this case to provide several look-up tables as mentioned above, each table being used in a specific operating mode of the rotary machine.

As will be seen hereinafter in the light of the example embodiments of the mixing circuits 32, 32', 32", the latter form two different combination types of the signals that they receive as an input depending on whether the control signal $PWM_\alpha$ is high level or low level. (Where applicable combination means here a combination in which one of the two signals has a zero weight, that is to say only the other signal transmitted.)

The alternation of the two types of combination (signals $K_u$, $K_v$, $K_w$) is emitted at the output of each mixing circuit 32, 32', 32" intended for a low-pass filter, the cutoff frequency of which is lower than the frequency of the control signal $PWM_\alpha$ (that is to say than the alternation frequency of the two types of combination) so that the filtered signal at all times forms the average of the combinations of the two types, weighted by the duration of each, which naturally depends on the duty cycle ratio $\alpha$ of the control signal $PWM_\alpha$.

The cutoff frequency of each low-pass filter 38, 38', 38" is however, higher than the frequency of the signals U, V, W so as to allow this component of the information to pass. Having regard to the conventional rotation speeds of rotary machines and the frequency of the sensor signals that result from this (typically between 0 and 600 Hz), use is made for example of a cutoff frequency of 10 kHz, which makes it possible to use for example also a frequency of 130 kHz for the control signal.

The filtered signal $F_u$, $F_v$, $F_w$ emitted by each low-pass filter 38, 38', 38" is therefore a combination of the sensor signals received at the input of the corresponding mixing circuit 32, 32', 32" in which the influence of each of the signals received at the input of the corresponding mixing circuit 32, 32', 32" depends on the duty cycle ratio of the control signal $PWM_\alpha$. In this way a signal is obtained whose phase lies between the phases of the input signals and is adjustable by modification of the duty cycle ratio $\alpha$ of the control signal $PWM_\alpha$.

The filtered signals $F_u$, $F_v$, $F_w$ are applied respectively to a first input of corresponding second hysteresis trigger circuits 40, 40', 40" that each receive at a second input the average of the sensor signals U, V, W determined by an averaging circuit 42 and by a low-pass filter 43 of the same type as the low-pass filters 38, 38', 38" previously mentioned. By virtue of the use of the hysteresis triggers 40, 40', 40", the voltage differences generated in the mixing circuits 32, 32', 32" are dispensed with.

There are thus obtained, at the output of the hysteresis triggers 40, 42' 40", signals U', V', W' corresponding respectively to the input sensor signals U, V, W with a phase lead that depends on the duty cycle ratio $\alpha$ of the control signal $PWM_\alpha$.

Figure 3:
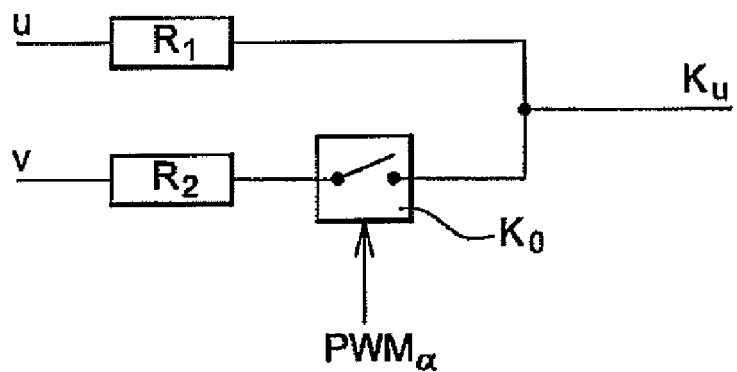
FIGS. 3 and 4 depict possible embodiments of a mixing circuit of FIG. 2.

FIG. 3 depicts a first example that can be envisaged for using each of the mixing circuits 32, 32', 32" described above. This example is written as a use of the mixing circuit 32 (which receives as an input the signal U and the signal V in phase lead of 120° with respect to the signal U) but applies identically to the mixers 32', 32" by applying respectively as an input the signals V and W and the signals W and U.

In this example embodiment, the first signal (here the signal U) is applied to a node forming the output through a resistor R1, while the second signal $K_u$ (here the signal V) is applied to this same node through the series association of a resistor R2 and a switch $K_0$ switched on command from the control signal $PWM_\alpha$.

There is thus obtained as an output (that is to say at the aforementioned node) a signal $K_u$ that depends only on the sensor signal U during phases of the control signal $PMW_a$ that forces the opening of the switch $K_0$, while the output signal $K_u$ depends both on the signals U and V (also weighted according to the resistors R1 and R2) during phases of the control signal $PWM\alpha$ that cause the closure of the switch $K_0$. This solution therefore makes it possible to obtain, after low-pass filtering, a filtered signal $F_u$.

It can thus be seen clearly that there are obtained, for values of the duty cycle ratio $\alpha$ varying between 0 and 1, an output signal $F_U$ whose phase varies between that of the signal U itself (when $\alpha=0$) and a phase close to that of the signal V (itself in phase lead of 120° with respect to the signal U) when $\alpha=1$, by choosing suitable values for R1 and R2 (the greater R1 is with respect to R2, the more the phase lead of $F_U$ approaches 120° for $\alpha=1$).

Figure 4:
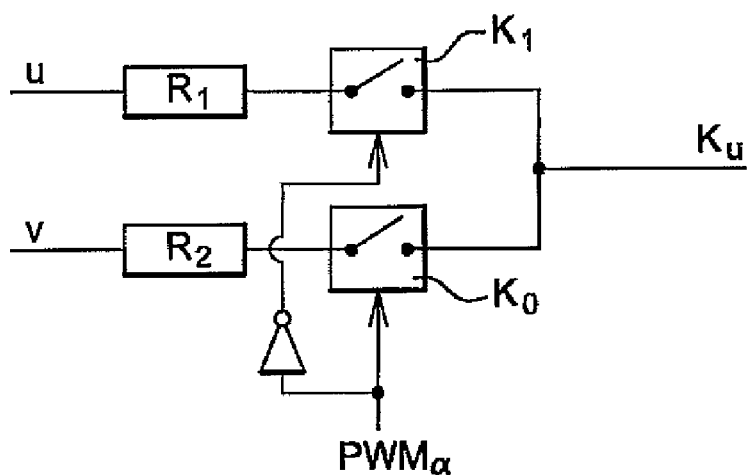

FIG. 4 depicts a second example embodiment for the mixing circuits 32, 32', 32" in FIG. 2.

As before, the example described applies to the mixing circuit 32 but would apply identically to the mixing circuit 3', 32".

In this second example, the sensor signal U is transmitted to a node forming an output through the series association of a resistor R1 and a switch $K_1$, while the sensor signal V is transmitted to the node forming an output through the series association of a resister R2 and a switch $K_0$.

The switch $K_0$ is switched according to the control signal $PWM_\alpha$ while the switch $K_1$ receives the same control signal $PWM_\alpha$ through an inverter gate so that the switch $K_1$ is switched opposite to the switch $K_0$.

In the phases where the control signal $PWM_\alpha$ causes the opening of the switch $K_0$, it thus causes the closure of the switch $K_1$ so that the output signal $K_U$ (at the node forming an output) depends only on the sensor signal U.

Conversely, when the control signal $PMW_\alpha$ causes the closure of the switch $K_0$, it also causes the opening of the switch $K_1$ so that the output signal $K_U$ depends only on the sensor signal V.

This solution makes it possible to obtain for the filtered signal $F_U$.

As before, by varying the duty cycle ratio $\alpha$ between 0 and 1, there is obtained a phase lead of the signal $F_U$ with respect to the signal U that is variable between 0° (for $\alpha=0$) and this time precisely 120° (for $\alpha=1$).

Figure 5:
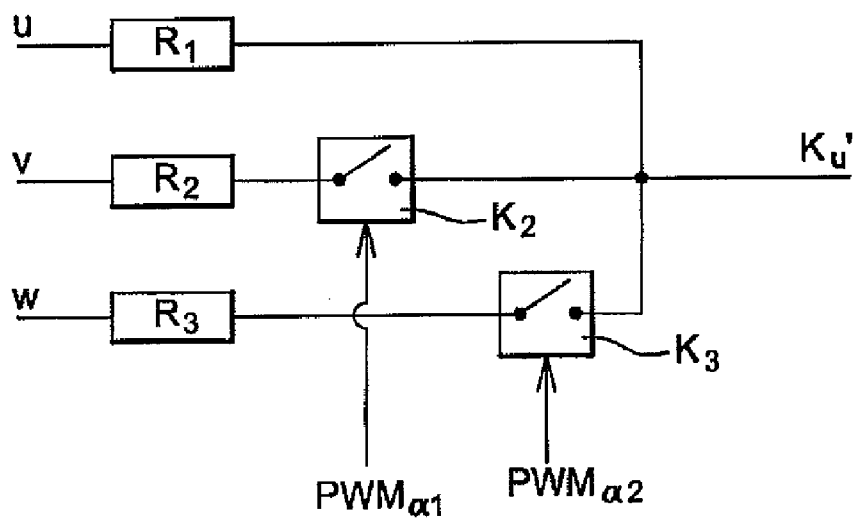
FIG. 5 depicts a variant embodiment of the mixing circuit.

FIG. 5 depicts a variant embodiment of a mixing circuit according to which the mixing circuit receives as an input the three sensor signals U, V, W.

The sensor signal U is transmitted to a node forming an output through a resistor R1.

The sensor signal V (in phase lead of 120° with respect to the signal U) is transmitted to the node forming an output through the series association of a resistor R2 and a first switch $K_2$ controlled by a first control signal $PWM_{\alpha1}$.

As for the sensor signal W, this is transmitted to the node forming an output through a series association of the same type, namely a resistor R3 and a second switch K3 controlled by a control signal $PWM_{\alpha2}$.

There is therefore obtained, after low-pass filtering as described before, a signal $F_{U'}$.

The lead of the signal at the phase output can thus vary between 0° and a value slightly less than 240° (choosing resistance levels for the resistors R1, R2, R3 that make the signal U on the output node $K'_U$ negligible when the switch $K_3$ is closed).

Figure 6:
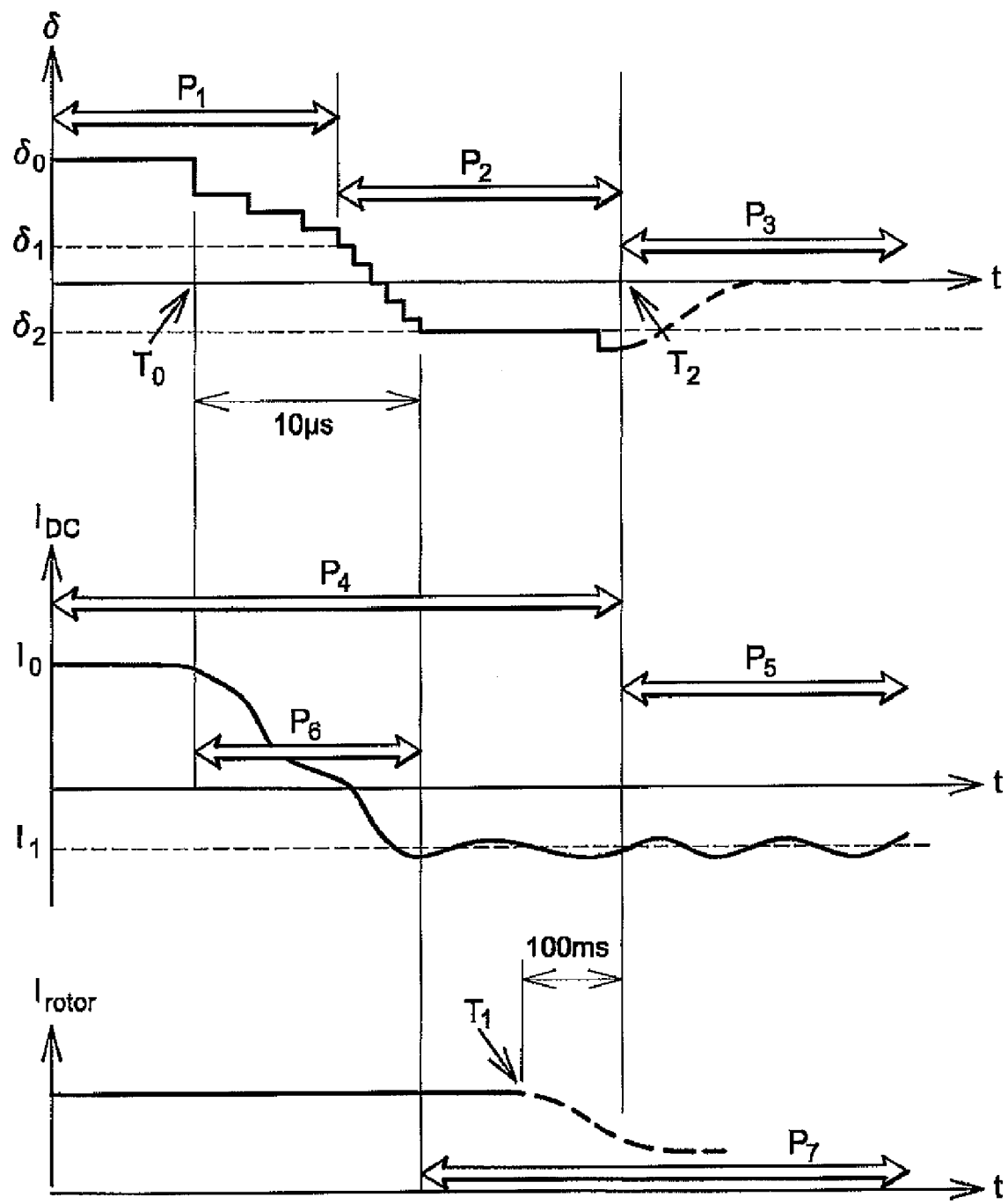
FIG. 6 depicts an example of transition from a motor mode to an alternator mode according to the teachings of the invention.

FIG. 6 depicts a possible example of implementation of a transition between a motor mode of the alternator starter and an alternator mode in which the coil currents are controlled by diodes of the power bridge (rectification mode), passing through a controlled alternator mode in which the switches of the power bridge 10 are always controlled by the control circuit 20.

In the initial phases of this transition, the alternator starter functions in motor mode, for example to assist the rotation of the thermal engine that is associated with it. In this operating phase, the phase difference value δ allows triggering in phase lead of the voltage with respect to the electromotive force, so that the current can increase sufficiently without being smothered and thus generate a high torque even at relatively high rotation speeds. This phase difference value is initially $δ_0$.

For example, for a rotation speed of 6000 rev/min, a maximum torque is obtained for a phase lead δ of around 75° (for example between 70° and 80°).

The procedure of transition to alternator mode then begins at a time $T_0$ with the reduction, for example in successive steps, of the phase lead value δ to a second value $δ_2$.

The change of the value from $δ_0$ to $δ_2$ takes place for example over a period of 10 μs, passing for example through around ten intermediate values. The reduction in the phase lead δ from the initial value $δ_0$ causes a reduction in the motor torque generated by the electrical machine, until the phase lead reaches a first value $δ_1$ at which the torque supplied by the electrical machine is cancelled out.

It is thus possible to define a phase $P_1$ of the transition during which the phase lead values vary between $δ_0$ and $δ_1$ and which therefore allow the production of a lower and lower motor torque: the phase P1 can thus be termed motor mode.

As already mentioned, the reduction in the phase lead δ continues below the value $δ_1$ so that the electrical machine generates a more and more resisting torque: the direct current $I_{DC}$ is therefore reversed and causes a charging of the battery: this is then working in "controlled alternator" mode P2.

In the case of a rotation at 6000 rev/min studied here, the change in direction of the direct current $I_{DC}$ occurs for the first phase difference value $δ_1$ of around 25° (in general between 20° and 30°). It is possible in this case also to stabilise the functioning in controlled alternator mode at the second phase difference value $δ_2$ between 0° and −30°.

It is thus possible to change, over a relatively brief time $P_6$ (here 10 μs), from functioning of the motor type to functioning of the alternator type. During this phase $P_6$, the current of the rotor has been maintained and the reduction, and then reversal, of the torque is represented by a change in sign of the direct current $I_{DC}$.

Thus, as from the moment of the decision to change to alternator mode (time $T_0$ mentioned above), the change in the direction of the direct current $I_{DC}$ (period $P_6$) is relatively quick, around 10 μs, which makes it possible to obtain, in the short run, a direct current $I_1$ available for supplying the electrical system of the vehicle (period $P_7$).

It can be noted that, in motor mode $P_1$ and in controlled alternator mode $P_2$, the phase difference δ makes it possible to control the direct current $I_{DC}$ (period $P_4$).

Once the functioning in controlled alternator mode $P_2$ is stabilised (that is to say the machine generates an approximately stable current as indicated over the period $P_7$), the rotor is defluxed as from a time $T_1$, which corresponds to the reduction in the current in it with a relatively high time constant (in general around 100 ms).

The reduction in the current in the rotor $I_{rotor}$ may make necessary a slight correction in the phase difference δ as indicated in FIG. 6 (where the value of δ decreases slightly at the end of the period of functioning in controlled alternator mode $P_2$).

When the rotor is defluxed, that is to say the current therein arrives at the level that is should be in alternator functioning, it is possible to terminate the control of the power bridge 10 by the control circuit 20 at a time $T_2$, so that the machine functions as a conventional alternator, in rectification mode: this is the alternator mode $P_3$ where the conduction in the coils is controlled by diodes of the power bridge. The direct current $I_{DC}$ then depends on the rotor current $I_{rotor}$ (period $P_5$) rather than on the phase difference δ.

The time $T_2$ is for example predefined 100 ms after time $T_1$ so as to allow sufficient refluxing before going into alternator mode $P_3$.

In the example transition that has just been described, the refluxing of the rotor is commenced at a time $T_1$ subsequent to the going into the controlled alternator mode $P_2$ that is accompanied by the change in sign of the direct current $I_{DC}$. In a variant, the rotor can be defluxed sooner, namely for example as soon as the transition phase is triggered at time $P_0$.

The above examples represent only possible embodiments of the invention, which is not limited to them.

The invention claimed is:

1. A method of controlling a reversible polyphase rotary electrical machine operating in a motor mode as a motor, in a rectification mode as an alternator and in a controlled alternator mode transitioning between the motor mode and the rectification mode, the rotary electrical machine including a switch bridge (10) at least one coiled circuit (12) supplied through the switch bridge (10), the method comprising the following steps:
   controlling ($P_1$) the bridge (10) in the motor mode in order to deliver to the coiled circuit (12) a periodic voltage with a phase difference (δ) with respect to an electromotive force induced in the coiled circuit being in a range between an initial value ($δ_0$) and a first value ($δ_1$), such that a motor torque is generated, the initial value ($δ_0$) of the phase difference being higher than the first value ($δ_1$);
   controlling ($P_2$) the bridge (10) in the controlled alternator mode in order to deliver to the coiled circuit (12) the periodic voltage with the phase difference (δ) being in a range between the first value ($δ_1$) and a second value ($δ_2$) causing the production of a torque lying between the motor torque and a resisting torque of opposite sign to the motor torque, the phase difference taking a plurality of values during this control, the first value ($δ_1$) of the phase difference being higher than the second value ($δ_2$); and
   switching ($T_2$) the bridge (10) into the rectification mode.

2. The method according to claim 1, wherein the phase difference (δ) of the voltage delivered takes a plurality of values decreasing over time between the initial value ($δ_0$) and the second value ($δ_2$).

3. The method according to claim 2, the use of the initial value of the phase difference ($δ_0$) and the use of the second value of the phase difference ($δ_2$) are separated by a time of between 1 μs and 100 δs.

4. The method according to claim 2, further comprising a step ($T_1$) of reducing an induction current ($I_{rotor}$) in the rotor, the reduction step lying between the step ($P_2$) of controlling the bridge with a second phase difference and the step ($T_2$) of switching the bridge into the rectification mode.

5. The method according to claim 4, further comprising the step of reducing the induction current initiated while the motor torque is generated.

6. The method according to claim 4, wherein the switching step ($T_2$) is subsequent to the reduction step ($T_1$) by more than 10 ms.

7. The method according to claim 4, wherein in the switching step ($T_2$) is subsequent to the reduction step ($T_1$) by less than 0.5 s.

8. The method according to claim 2, wherein the phase difference ($\delta$) decreases in successive steps between the initial and second phase difference values.

9. The method according to claim 1, wherein the rotation speed of the rotary machine is essentially constant during all the aforementioned steps.

10. The method according to claim 1, wherein the opposite-sign torque is approximately equal to a torque exerted by the rotary machine in the rectification mode.

11. The method according to claim 1, wherein the rotary electrical machine does not generate the motor torque when the phase difference ($\delta$) reaches the first value ($\delta_1$).

12. A reversible polyphase rotary electrical machine operating in a motor mode as a motor, in a rectification mode as an alternator and in a controlled alternator mode transitioning between the motor mode and the rectification mode the rotary electrical machine comprising:

a switch bridge (10) and at least one coiled circuit (12) supplied through the switch bridge (10);

first means of controlling the bridge (10) in the motor mode in order to deliver to the coiled circuit (12) a periodic voltage with a phase difference ($\delta$) with respect to an electromotive force in the coiled circuit being in a range between an initial value ($\delta_0$) and a first value ($\delta_1$), such that a motor torque is generated, the initial value ($\delta_0$) of the phase difference being higher than the first value ($\delta_1$);

second means of controlling the bridge (10) in the controlled alternator mode in order to deliver to the coiled circuit (12) the periodic voltage with the phase difference ($\delta$) being in a range between the first value ($\delta_1$) and a second value of the phase difference ($\delta_2$) causing the production of a torque lying between the motor torque and a resisting torque of opposite sign to the motor torque, the phase difference taking a plurality of values during this control, the first value ($\delta_1$) of the phase difference being higher than the second value ($\delta_2$); and means for switching the bridge (10) into the rectification mode.

13. The rotary electrical machine according to claim 12, further comprising at least one mixing circuit (32).

14. The rotary electrical machine according to claim 13, wherein the mixing circuit comprises at least one switch.

15. The rotary electrical machine ine according to claim 13, wherein the mixing circuit comprises at least one resistor.

16. The rotary electrical machine according to claim 12, wherein the motor torque is not generated when the phase difference ($\delta$) reaches the first value ($\delta_1$).

* * * * *